(12) United States Patent
Ryu et al.

(10) Patent No.: US 7,724,315 B2
(45) Date of Patent: May 25, 2010

(54) LIQUID CRYSTAL DISPLAY MODULE FOR LIQUID CRYSTAL DISPLAY DEVICE AND A METHOD FOR ASSEMBLING THE SAME

(75) Inventors: Ho-Han Ryu, Yongin-si (KR); Hee-June Kwak, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 460 days.

(21) Appl. No.: 09/882,043

(22) Filed: Jun. 18, 2001

(65) Prior Publication Data

US 2002/0054249 A1    May 9, 2002

(30) Foreign Application Priority Data

Nov. 7, 2000   (KR) .............................. 2000-65707

(51) Int. Cl.
*H01R 12/00* (2006.01)
(52) U.S. Cl. .............................. 349/58; 348/60; 348/61
(58) Field of Classification Search ................... 349/58, 349/60, 61
See application file for complete search history.

(56) References Cited

U.S. PATENT DOCUMENTS 6,460,998 B1 * 10/2002 Watanabe ..................... 353/20
6,476,883 B1 * 11/2002 Salimes et al. ................ 349/58
6,593,979 B1 * 7/2003 Ha et al. ........................ 349/58
2002/0054249 A1 * 5/2002 Ryu et al. ...................... 349/58

FOREIGN PATENT DOCUMENTS

| JP | 11-190835 | 7/1999 |
|---|---|---|
| JP | 2000-235350 | 8/2000 |
| JP | 2000-258756 | 9/2000 |

* cited by examiner

*Primary Examiner*—Howard Weiss
*Assistant Examiner*—Steven H Rao
(74) *Attorney, Agent, or Firm*—Innovation Counsel LLP

(57) ABSTRACT

A liquid crystal display module, a liquid crystal display device, and a method for assembling the liquid crystal display device, which are capable of minimizing the overall size of the liquid crystal display device by improving an engaging structure between the liquid crystal display module and a case, are disclosed. Engaging holes are formed in an unused region of a top chassis, a mold frame and an end portion of a back cover. One side of a shaft screw is engaged with a catching member integrally formed with the inner side upper surface of a case. The other side of the shaft screw penetrates through the engaging holes of the top chassis, the mold frame, and the back cover and is engaged with a nut screw on a rear surface of the back cover. Accordingly, a separate space for installing a fixing member for fixing the mold frame and the back cover to the case is not needed, and the case, the mold frame, and the back cover is not engaged by using a separate screw. Therefore, the overall size of the liquid crystal display device can be minimized, and the number of parts and the number of assembling processes can be remarkably reduced.

16 Claims, 10 Drawing Sheets

LIQUID CRYSTAL DISPLAY MODULE FOR LIQUID CRYSTAL DISPLAY DEVICE AND A METHOD FOR ASSEMBLING THE SAME

BACKGROUND OF THE INVENTION

1. Field of the Invention

The present invention relates to a liquid crystal display device, and more particularly to a liquid crystal display module, a liquid crystal display device, and a method for assembling the liquid crystal display device, which can minimize the overall size of the liquid crystal display device by improving the engaging structure of the liquid crystal display module and a case.

2. Description of the Related Art

Recently, an information processing device has been developed to have a various shape, a various function, and a rapid information processing speed. The information processed in the information processing device is represented as electrical signals. In order to figure out the information processed in the information processing device for a human being, a display device is needed as interface.

Recently, a liquid crystal display device that is lighter, and smaller than a CRT type display device has been developed. The liquid crystal display device has a function such as a full color and a high resolution. As a result, the liquid crystal display device is widely used as a monitor of a computer, a television, and another display device.

The liquid crystal display device applies voltages a layer of liquid crystal to convert the molecular arrangement to another molecular arrangement. The liquid crystal display device converts the changes of optical properties to visional changes and uses the modulation of a light by using a liquid crystal cell.

Liquid crystal display devices are sorted to a TN (Twisted Nematic) device and an STN (Super-Twisted Nematic) device, and are sorted to an active matrix display that uses a switching device and a TN liquid crystal and a passive matrix display that uses a STN liquid crystal according to the driving type.

The active matrix display is used in a TFT-LCD and drives an LCD by using a TFT as a switch. The passive matrix display does not use any transistor and does not need a complex circuit.

Further, liquid crystal display devices are sorted to a transmitive liquid crystal display device that uses a back light and a reflective liquid crystal display device that uses an exterior light source depending on the way of getting a light source.

The transmitive liquid crystal display device that uses the back light as a light source is heavy and voluminous due to the existence of the back light, but is widely used since it displays independently without using an outside light source.

FIG. 1 is an exploded perspective view for schematically showing a conventional liquid crystal display device. FIG. 2 is a partial exploded perspective view of the liquid crystal display device shown in FIG. 1.

Referring to FIG. 1, the liquid crystal display device 900 has a liquid crystal display module 700 to which an image signals is applied to display the screen, and a front surface case 810 and a rear surface case 820 that receive the liquid crystal display module 700.

The liquid crystal display module 700 has a display unit 710 that comprises a liquid crystal display panel.

The display unit 710 has a liquid crystal display panel 710, an integrated printed circuit board 714, a data side tape carrier package 716, and a gate side flexible circuit board 718 manufactured by the COF method.

The liquid crystal display panel 712 has a thin film transistor substrate 712a, a color filter substrate 712b, and a liquid crystal layer between (not shown).

The thin film transistor substrate 712a is a transparent glass substrate in which thin film transistors of a matrix type are formed. Data lines are connected to source terminals of the thin film transistors, and gate lines are connected to gate terminals of the thin film transistors. Pixel electrodes of indium tin oxide (ITO), which is a transparent conductive material, are formed in drain terminals.

If electrical signals are inputted to the data lines and the gate lines, the electrical signals are inputted to the source terminals and the gate terminals of thin film transistors and the thin film transistors are turned on or off so that electrical signals needed for forming pixels are outputted to the drain terminals.

The color filter substrate 712b is opposite to the thin film transistor substrate 712a. RGB pixels through which a light is passed to realize a color is formed in the color filter substrate 712b by a thin film process. A common electrode of ITO is laid on the color filter substrate 712b.

If a voltage is applied to the gate terminals and the source terminals of the transistors and the thin film transistors are turned on, an electric field is formed between the pixel electrode and the common electrode of the color filter substrate. The arrangement of the liquid crystals injected between the thin film transistor substrate 712a and the color filter substrate 712b changes by the electric field, and the transmittance of light changes as the arrangement changes.

A driving signal and a timing signal is applied to the gate line and the data line of the thin film transistor to control the arrangement of the liquid crystal of the liquid crystal display panel 712 and the timing of when the liquid crystal is arranged. The data side tape carrier package 716 which is a kind of flexible circuit board that determines the timing when the data driving signal is applied is attached to the source side of the liquid crystal display panel 712, and the gate side flexible circuit board 718 manufactured by the COF method for determining the time at which the gate driving signal is applied is attached to the gate side of the liquid crystal display panel 212.

The integrated printed circuit board 714 for receiving image signals from outside of the liquid crystal display panel 712 and applying driving signal to the gate line and the data line is connected to the data tape carrier package 714 of the data line side of the liquid crystal display panel 712. The integrated printed circuit board 714 has a source part to which the image signals generated in an exterior information processing device (not shown) such as a computer are applied to provide the data driving signals to the liquid crystal display panel 712 and a gate portion for providing the gate driving signals to the gate line of the liquid crystal display panel 712. Namely, the integrated printed circuit board 714 generates the gate driving signals for driving the liquid crystal display device, the data signals, and a plurality of timing signals for applying the signals at a proper time. The gate signals are applied to the gate line of the liquid crystal display panel 712 through the gate side flexible circuit board 718, and the data signals are applied to the data line of the liquid crystal display panel 712 through the data tape carrier package 716.

A back light assembly 720 that provides a uniform light to the display unit 710 is located under the display unit 710. The back light assembly 720 has a linear lamp 722 on one side of the liquid crystal display module 700 to provide the light. A light guide plate 724 has a size corresponding to the liquid crystal display panel 712 of the display unit 710, and is located under the liquid crystal display panel 712. The lamp side of the light guide plate 724 is the thickest. The thickness gradually decreases as goes away from the lamp 722. The light guide plate 724 guides the light generated in the lamp 722 towards the display unit 710, and changes the passage of the light.

A plurality of optical sheets 726 that spread and intensify the light and pass it towards the liquid crystal display panel 712 are provided above the light guide plate 724. A reflection plate 728 provided under the light guide plate 724 reflects the light leaking from the light guide plate 724 and promotes the efficient use of the light.

The display unit 710 and the back light assembly 720 is fixed and supported by a mold frame 730 which is a receiving receptacle. The mold frame 730 has a box-shape, and the upper surface of the mold frame 730 is open. Namely, the mold frame 730 has four side walls and a bottom surface. And openings for bending the integrated printed circuit board 714 along the outer side surface of the mold frame 730 and for positioning the integrated printed circuit board 714 are formed on the back of the bottom surface.

A chassis 740 for bending the integrated printed circuit board 714 of the display unit 710 and the gate tape carrier package 718 outside of the mold frame 730 and fixing the integrated printed circuit board 714 of the display unit 710 and the gate tape carrier package 718 to the bottom surface of the mold frame 730 to prevent the deviation of the display unit is provided. The chassis 740 has a box-shape. The upper surface of the chassis 740 is open to expose the liquid crystal display panel 710, and the side walls are bent inwardly to cover the upper surface peripheral portion of the liquid crystal display panel 710.

On the other hand, referring to FIG. 2, a plurality of protruding portions 731, 733, 735, and 737 for engaging the mold frame 730 to the front case is formed on the outer surfaces of the opposite side walls of the mold frame 730, and engaging holes 731a, 733a, 735a, and 737a are formed in the protruding portions 731, 733, 735, and 737. Bosses (not shown) having nut portions (not shown) are formed on the bottom surface of the front case so that screws 750, 753, 755, and 757 are engaged through the engaging holes 731a, 733a, 735a, and 737a at positions corresponding to the protruding portions 731, 733, 735, and 737.

However, if the mold frame 730 is engaged with the front case 810 in the above-mentioned manner, the sizes of the front case 810 and the rear case 820 are increased by the length of the protruding portions 731, 733, 735, and 737. Therefore, the overall size of the liquid crystal display device 900 increases.

SUMMARY OF THE INVENTION

Therefore, the present invention has been made to solve the above-mentioned problem, and accordingly it is an object of the present invention to provide a liquid crystal display module capable of minimizing the size of a liquid crystal display device by improving the engaging structure of the liquid crystal display module.

It is another object of the present invention to provide a liquid crystal display device capable of minimizing the overall size of the liquid crystal display device by improving the engaging structure of the liquid crystal display module and the case.

It is another object of the present invention to provide a method for assembling a liquid crystal display device capable of minimizing the overall size of the liquid crystal display device by improving an engaging structure of a liquid crystal display module and a case.

To achieve the aforementioned object of the present invention, a liquid crystal display module according to the present invention sequentially receives a back light assembly having a light source for generating a light and a display unit for receiving the light from the back light assembly and displaying an image. A first engaging hole is formed at the bottom surface of a mold frame. A top chassis is engaged so as to be opposite to the mold frame and guides the position of the display unit, and a second engaging hole is formed at a position corresponding to the first engaging hole.

To achieve the aforementioned object of the present invention, a liquid crystal display device according to the present invention includes a liquid crystal display module having a receiving receptacle and a top chassis, a case that receives the top chassis and has a catching member, and an engaging member. The receiving receptacle sequentially receives a back light assembly having a light source for generating a light and a display unit for receiving the light from the back light assembly and displaying an image, and a first engaging hole is formed on the bottom surface of the receiving receptacle. The top chassis is engaged so as to be opposite to the receiving receptacle and guides the position of the display unit, and a second engaging hole is formed at a position corresponding to the first engaging hole. One side of the engaging member is engaged with the catching member, and penetrates through the first and second engaging holes to fix the receiving receptacle and the top chassis to the case.

At this time, the light source part comprises a lamp for generating the light, a lamp holder engaged with both ends of the lamp for fixing the position of the lamp, and a lamp cover for covering and protecting the lamp. The first engaging hole is overlapped at least with the lamp cover when viewed from the side on which the lamp is positioned in the mold frame.

The bottom surface of the receiving receptacle is one of the mold frame and the back cover. The catching member is plurally formed at both end portions of the inner side bottom surface of the case. The first and second engaging holes are plurally formed respectively, and the case is one of the front case and the rear case.

The catching member is integrally formed with the case and is a support surface extended from the side wall of the case in parallel to the bottom surface of the case. A through-hole for receiving the engaging member is formed at a central portion of the support surface. A guide recess for guiding the engaging member to the through-hole is formed from the through-hole of the support surface in a direction of an end portion of one side of the support surface.

The engaging member comprises first and second engaging members. The first engaging member has a head portion wider than the through-hole to prevent the deviation from the through-hole of the support surface and a body portion penetrated through the first and second engaging holes and protruded to the rear surface of the receiving receptacle and having a screw recess at one end portion thereof. The second engaging member is engaged with the screw recess of the first engaging member to fix the receiving receptacle and the top chassis to the case.

To achieve the aforementioned object of the present invention, a liquid crystal display module for sequentially receiving a back light assembly having a light source part for generating a light and display unit for receiving the light from the back light assembly and displaying an image is prepared. The liquid crystal display module has a receiving receptacle having a first engaging hole on the bottom surface thereof. The liquid crystal display module is engaged with the receiving receptacle such that it is opposite to the receiving receptacle to guide the position of the display unit. The liquid crystal display module has a top chassis in which a second engaging hole is formed at a position corresponding to the first engaging hole. Then, one side of a first engaging member is engaged with a case, and the liquid crystal display module is received in the case so that a body of the first engaging member is penetrated through the first and second engaging holes. Then, the first engaging member is pressed towards the case to fix the liquid crystal display module to the case.

After the first engaging member is penetrated through the first and second engaging holes, a second engaging member is engaged with one end portion of the first engaging member protruded outside of the liquid crystal display module.

According to the liquid crystal display module, the liquid crystal display device, and the method for assembling the liquid crystal display device, the engaging hole is overlapped at least with the lamp cover at an unused region of end portion of the top chassis and the mold frame. One side of the first engaging member is engaged with the catching member integrally formed at the inner side upper surface of the front case.

The other side of the first engaging member is penetrated through the engaging holes of the top chassis and the mold frame, and is engaged with the second engaging member on the rear surface of the mold frame. Namely, the first engaging member is engaged with the front case such that it is penetrated through the unused region of the top chassis and the mold frame, and fixes the mold frame in which the back light assembly and the display unit is received to the front case by the engagement with the second engaging member. If the back cover is provided on the rear surface of the mold frame, an engaging hole is formed at a position corresponding to the engaging hole formed in the mold frame and the engagement of the first engaging member and the second engaging member is accomplished on the rear surface of the back cover.

Accordingly, a separate space for installing a fixing member for fixing the mold frame to the front case is not needed. Therefore, the overall size of the liquid crystal display device is minimized. Further, since a separate screw is not needed to engage the front case with the mold frame, the number of parts and the number of assembling processes is remarkably reduced.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, a liquid crystal display module, a liquid crystal display device, and a method for assembling the liquid crystal display device according to a preferred embodiment of the present invention will be explained in detail with reference to the attached drawings.

In the preferred embodiment of the present invention, a monitor having a back cover will be explained, but the present invention is also applied to a liquid crystal display device for a portable computer system which does not includes the back cover.

Figure 1:
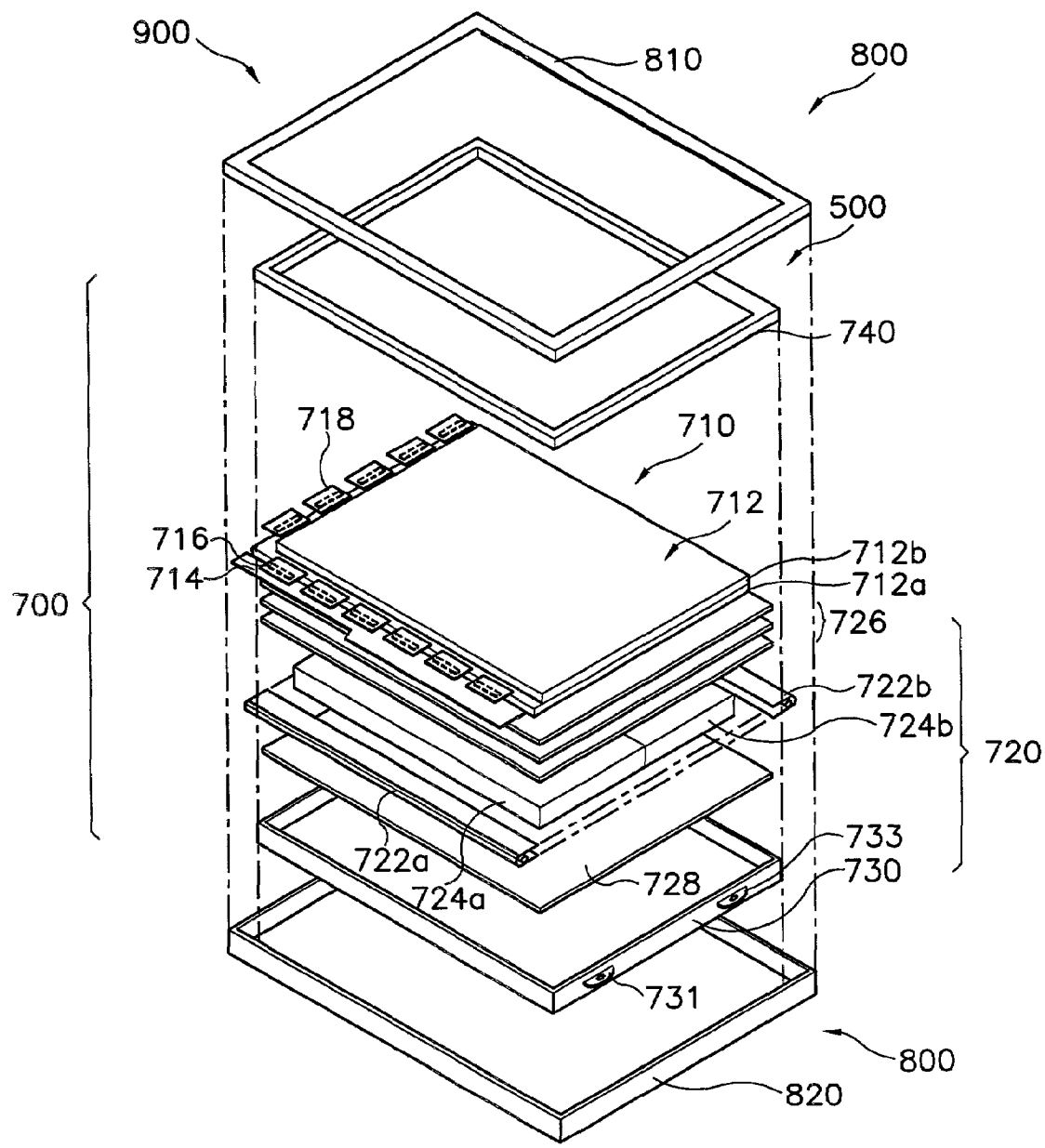
FIG. 1 is an exploded perspective view for schematically showing a conventional liquid crystal display device.
Figure 2:
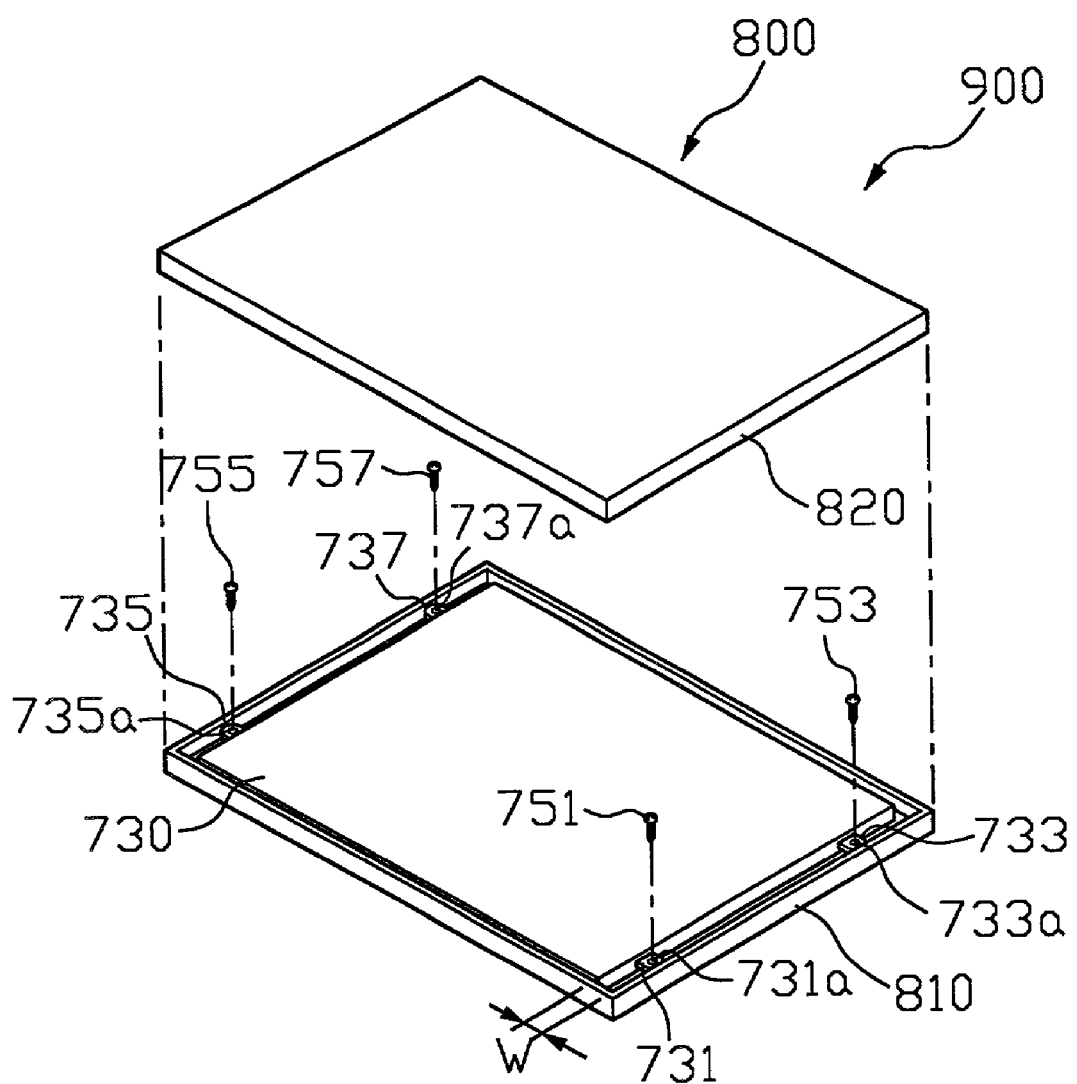
FIG. 2 is a partial exploded perspective view for showing the liquid crystal display device shown in FIG. 1.
Figure 3:
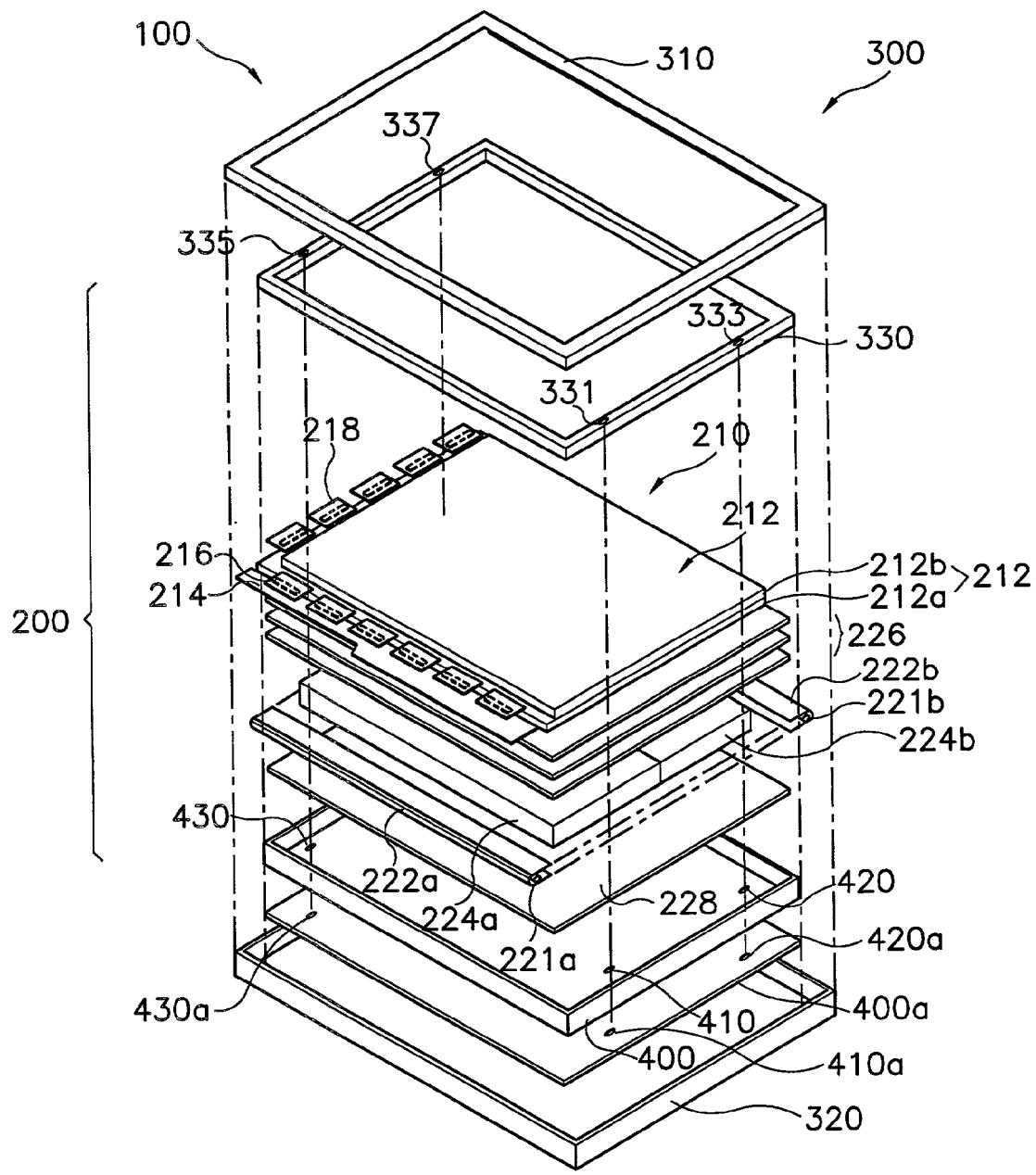
FIG. 3 is an exploded perspective view for showing a liquid crystal display device according to a preferred embodiment of the present invention.

FIG. 3 is an exploded perspective view for schematically showing a liquid crystal display device according to a preferred embodiment of the present invention.

Referring to FIG. 3, the liquid crystal display device 100 has a liquid crystal display module 300 in which an image signal is applied to display a screen and a case that receives the liquid crystal display module 200 and has a front case 310 and a rear case 320.

The liquid crystal display module 200 has a display unit 210 which includes a liquid crystal display panel that displays images.

The display unit 210 has a liquid crystal display panel 212, an integrated printed circuit board 214, a data side tape carrier package 216, and a gate side flexible circuit board 218 that is manufactured by a COF method.

The liquid crystal display panel 212 has a thin film transistor substrate 212a, a color filter board 212b, and a liquid crystal layer therebetween (not shown).

The thin film transistor substrate 212a is a transparent glass board in which thin film transistors of the matrix type are formed. A data line is connected to a source terminal of each thin film transistor, and a gate line is connected to a gate terminal of each thin film transistor. A pixel electrode of indium tin oxide (ITO), which is a transparent conductive material, is formed in a drain terminal of each thin film transistor.

If electrical signals are inputted to the data lines and the gate lines, the electrical signals are inputted to the source terminals and the gate terminals of the thin film transistors and the thin film transistors are turned on or off so that electrical signals needed for forming pixels are outputted to the drain terminals.

The color filter substrate 212b is opposite to the thin film transistor board 212a. RGB pixels is formed in the color filter substrate 212b by a thin film process. A common electrode of ITO is formed on the back surface of the color filter substrate 212b.

If power sources are applied to the gate terminals and the source terminals of the transistors and the thin film transistors are turned on, an electric field is formed between the pixel electrode and the common electrode of the color filtersubstrate. The arrangement of the liquid crystals injected between the thin film transistor board 212a and the color filter board 214b is changed by the electric field, and the optical transmitting degree changes as the arrangement of liquid crystals changes to obtain a pixel image.

A driving signal and a timing signal is applied to the gate line and the data line of the thin film transistor to control the arrangement of the liquid crystals of the liquid crystal display panel 212 and the timing of the liquid crystal arrangement.

The data side tape carrier package 216 which is a kind of flexible circuit board that determines the timing of the data driving signal is attached to the source side of the liquid crystal display panel 212, and the gate side flexible circuit board 218 manufactured by the COF method for determining the timing the gate driving signal is attached to the gate side of the liquid crystal display panel 212.

The integrated printed circuit board 214 for receiving image signals from outside of the liquid crystal display panel 212 and applying driving signal to the gate line and the data line is connected to the data tape carrier package 214 of the data line side of the liquid crystal display panel 212. The integrated printed circuit board 214 has a source part to which the image signals generated in an exterior information processing device (not shown) such as a computer are applied to provide the data driving signals to the liquid crystal display panel 212 and a gate portion for providing the gate driving signals to the gate line of the liquid crystal display panel 212.

Namely, the integrated printed circuit board 214 generates the gate driving signals for driving the liquid crystal display device, the data signals. It also provides a plurality of timing signals for properly applying the varieties signals. The gate signals are applied to the gate line of the liquid crystal display panel 212 through the gate side flexible circuit board 218, and the data signals are applied to the data line of the liquid crystal display panel 212 through the data tape carrier package 216.

A back light assembly 220 for providing a uniform light to the display unit 210 is provided under the display unit 210. The back light assembly 220 comprises linear lamps 221a and 221b that is provided on one side of the liquid crystal display module 200 to generates lights, and the linear lamps 221a and 221b are protected by lamp covers 222a and 222b. Light guide plates 224a and 224b have a size corresponding to the liquid crystal panel 212 of the display unit 210, and guide the lights generated in the linear lamps 221a and 221b towards the display unit 210 and change the paths of the lights.

The light guide plates 224a and 224b can be a plurality of guide plates which are adhered to each other as shown in FIG. 3, or a single guide plate can be used.

A plurality of optical sheets 226 for making the uniform luminance of the lights irradiated from the guide plates towards the liquid crystal display panel 212 are provided above the light guide plates 224a and 224b. A reflection plate 228 is provided under the light guide plates 224a and 224b to reflect the lights leaking from the light guide plates 224a and 224b.

The display unit 210 and the back light assembly 220 is supported by a mold frame 400 which is a receptacle assembly.

First to fourth engaging holes 331, 333, 335, and 337 are formed in the upper surfaces of both ends of the top chassis 330, and fifth to eighth engaging holes 410, 420, 430, 440 corresponding to the first to fourth engaging holes 331, 333, 335, and 337 are formed in both end portions of the bottom surface of the mold frame 400. A back cover 400a is made of a metal to minimize the EMI generated in a monitor system, and is engaged with the rear surface of the mold frame 400. Ninth through twelfth engaging holes 410a, 420a, 430a, and 440a corresponding to the first to fourth engaging holes 331, 333, 335, and 337 are formed in both end portions of the bottom surface of the back cover 400a. Shaft screws for fixing the mold frame 400 and the back cover 400a to the front case 310 penetrate the first to twelfth engaging holes 331, 333, 335, 337, 410, 420, 430, 440, 410a, 420a, 430a, and 440a. The first to twelfth engaging holes 331, 333, 335, 337, 410, 420, 430, 440, 410a, 420a, 430a, and 440a are formed in both end portions of the bottom surface of the top chassis 330, the mold frame 400, and the back cover 400a. However, a plurality of engaging holes can be formed only in one end of the bottom surface of the members.

Figure 4:
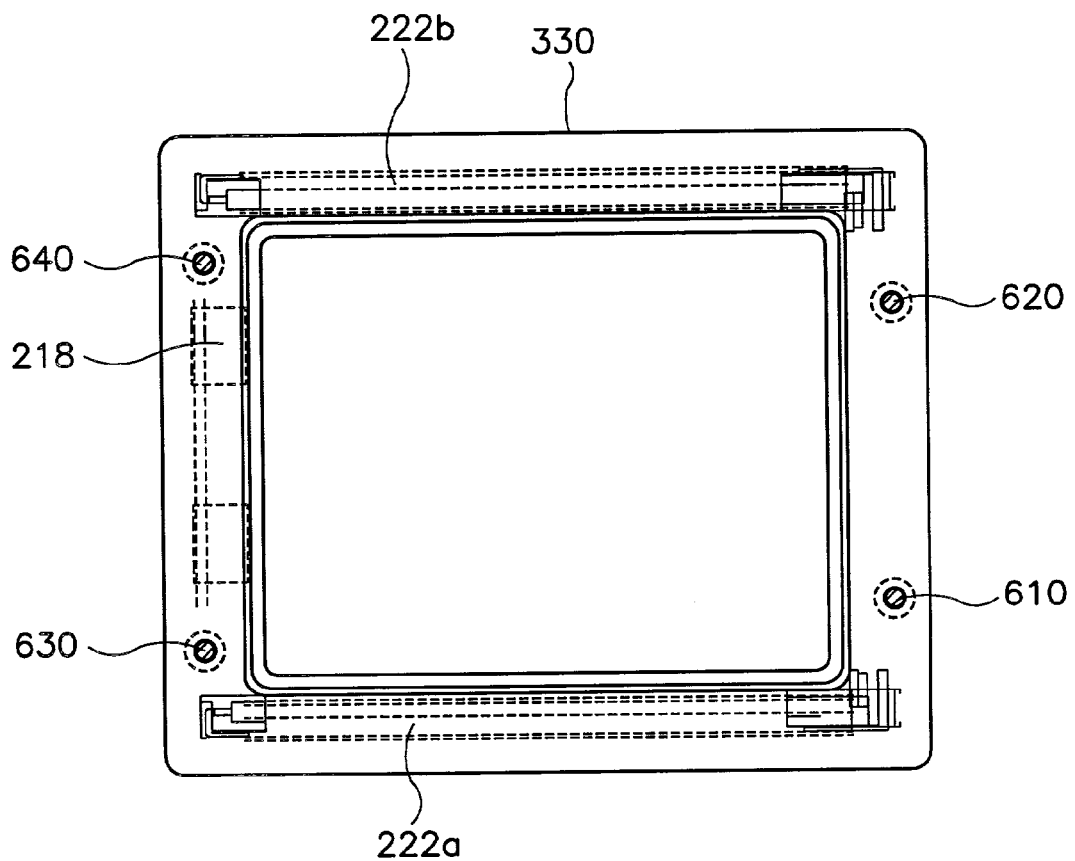
FIG. 4 is a top view for showing the state in which an engaging member shown in FIG. 3 is engaged with the liquid crystal display device.
Figure 5:
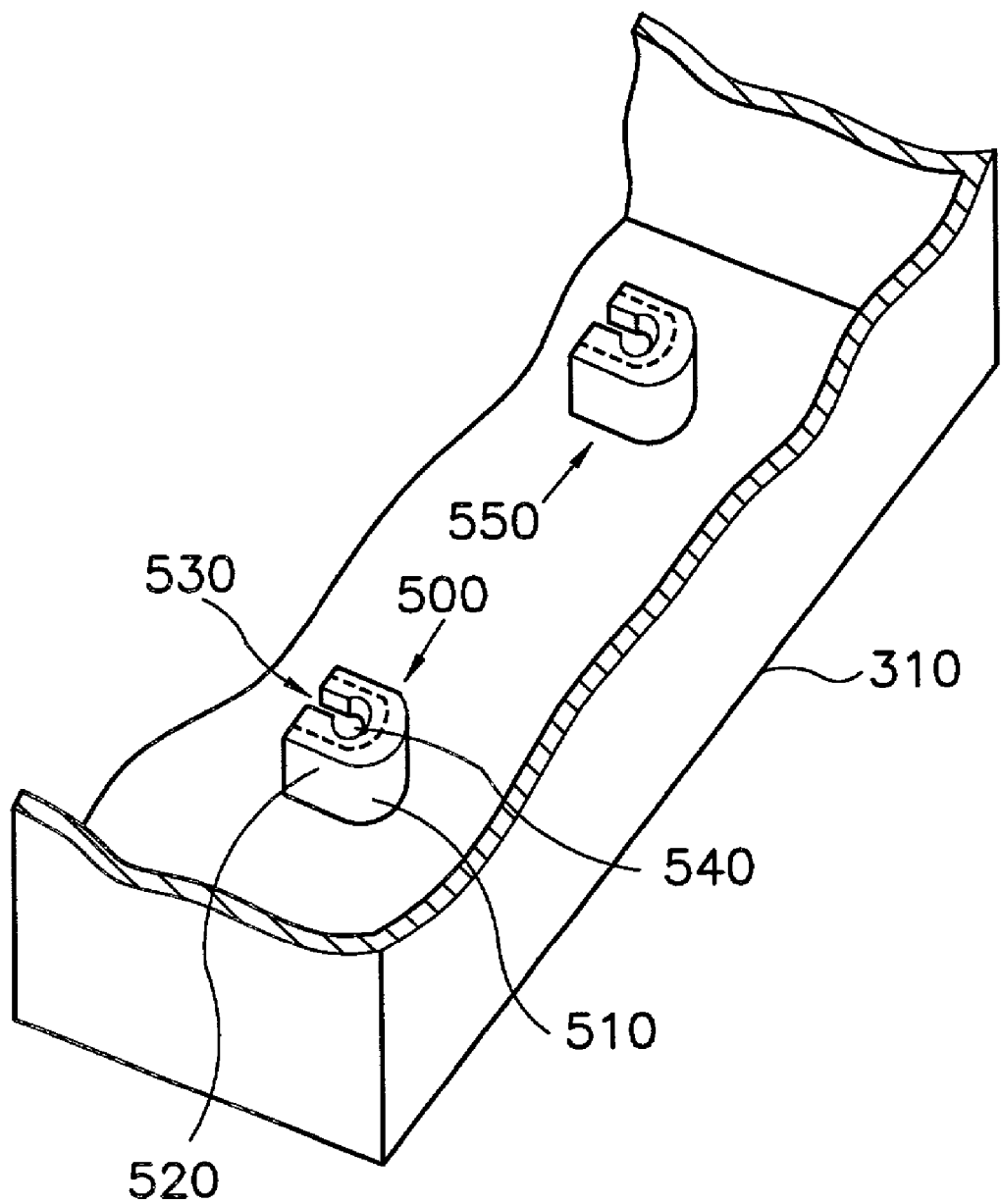
FIG. 5 is a perspective view for showing a portion of a catching member formed in a front case of the engaging member shown in FIG. 4.

FIG. 4 is a top view for schematically showing the state in which the engaging members according to the preferred embodiment of the present invention shown in FIG. 3 are engaged with the liquid crystal display device. FIG. 5 is a perspective view for showing a portion of the engaging member formed in the front case among the engaging members according to the preferred embodiment of the present invention shown in FIG. 4.

Referring to FIG. 4, the linear lamps 221a and 221b and the lamp covers 222a and 222b are installed in both opposite ends of the top chassis 330, and the light guide plates 224a and 224b are installed therebetween. The diffusion sheet 226 and the display unit 210 are received above the light guide plates 224a and 224b. The front case 310 are engaged with the upper surface of the top chassis 330, and first to fourth catching members (not shown) are integrally formed with the front case 310 at the position of the gate side flexible circuit board 218 and the position opposite to the gate side flexible circuit board 218.

The first to fourth shaft screws (not shown) are engaged with the first to fourth catching members (not shown), and are penetrated through the first to fourth engaging holes 331, 333, 335, and 337 of the top chassis 330, the fifth to eighth engaging holes 410, 420, 430, and 440 of the mold frame 400, and the ninth to twelfth engaging holes 410a, 420a, 430a, and 440a of the back cover 400a, and are engaged with nut screws (not shown) on the rear surface of the back cover 400.

The engaging structures of the first to fourth catching members (not shown) integrally formed with the front case 310 are shown in FIG. 5. In FIG. 5, the first and second catching members 500 and 550 formed in one end of the front case 310 among the first to fourth catching members (not shown) are explained. The first to fourth catching members are integrally formed with the front case 310, but the first to fourth catching members can be integrally formed with the rear case 320 shown in FIG. 3. The shaft screws are engaged with the nut screws at the upper surface of the top chassis 330.

Referring to FIG. 5, the first and second catching members 500 and 550 are integrally formed with the front case 310 at one end portion of the inner side upper surface (bottom surface in FIG. 5) of the front case 310. The third and fourth catching members are integrally formed with the front case 310 at the other end portion of the front case 310. The gate side flexible circuit board 218 is located at the end portion in which the third and fourth catching members (not shown) are formed. Accordingly, as shown in FIG. 4, the distance between the third and the fourth catching members (not shown) is longer than the distance between the first and second catching members 500 and 550.

Figure 6:
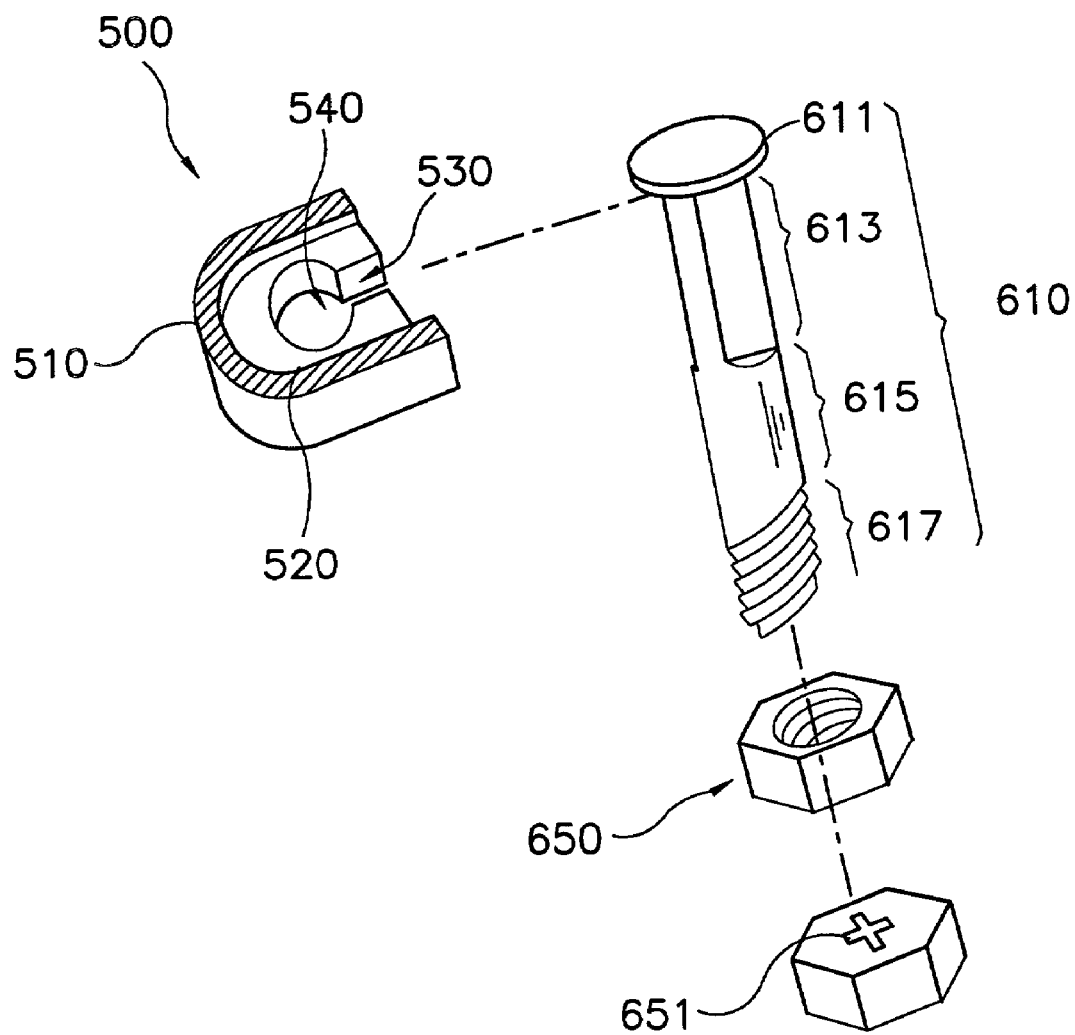
FIG. 6 is a partially cut-away exploded perspective view for showing a shaft screw for engaging a mold frame with the front case in the liquid crystal display device shown in FIG. 4.

The first catching member 500, as shown in FIG. 5, has a support shaft 510 that extends from the inner side upper surface of the front case 310 towards the direction in which the rear case 320 is located and a support surface 520 that is perpendicular to the support shaft 510 and extends towards the central portion of the display unit 210 so as to be parallel to the upper surface of the front case 310. A through-hole 540, in which a head portion of the first shaft screw 610 is inserted as shown in FIG. 6, is formed in the central portion of the support surface 520. A guide recess 530 is formed from one end portion of the support surface 520 towards the support shaft 510 so as to be open to the through-hole 540. The structure of the first catching member 500 is applied to the second to fourth catching members. The first catching member 500 can be formed by removing the support shaft 510 and extending the support surface 520 from the side wall of the front case 310.

Figure 7:
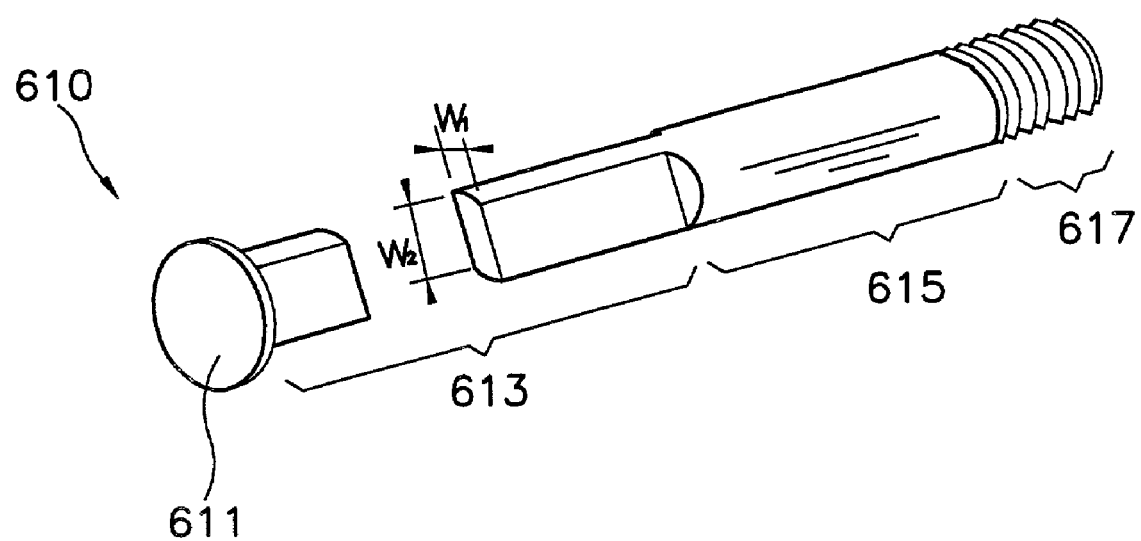
FIG. 7 is a perspective view for showing the cross-section of the shaft screw shown in FIG. 6.
Figure 8:
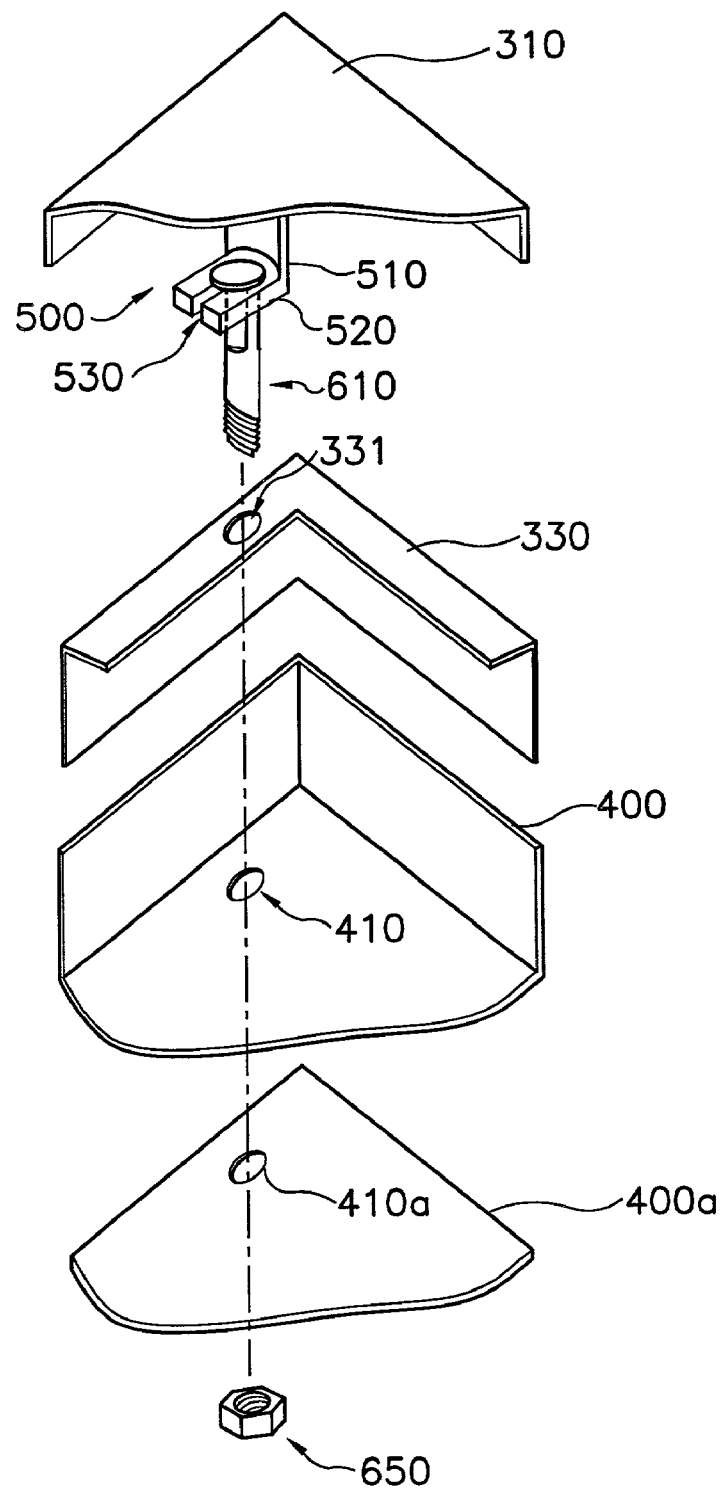
FIG. 8 is a partially cut-away perspective view for showing the state in which a catching member shown in FIGS. 5 and 6 is engaged with the shaft screw.

FIG. 6 is a partially cut-away exploded perspective view for showing a shaft screw for engaging the mold frame and the back cover to the front case in the liquid crystal display device according to the preferred embodiment of the present invention shown in FIG. 4. FIG. 7 is a cut-away perspective view for showing the cross-section of the shaft screw shown in FIG. 6, and FIG. 8 is a partially cut-away perspective view for explaining the engaging states of the engaging members according to the preferred embodiment of the present invention shown in FIG. 4.

Referring to FIG. 6, the first shaft screw 610 has a head portion 611 that has an area larger than the through-hole 540 of the catching member 500, and a neck portion 613 that is extended from the head portion 611. The head portion 611 can be formed in an arbitrary shape, but the area of the head portion 611 should be larger than the width of the though-hole 540 of the first catching member 500 to prevent the deviation of the first catching member 500. The thickness of the head portion 611 is thinner than the distance between the upper surface of the support surface 520 of the first catching member 500 and the inner side upper surface of the front case 310.

As shown in FIG. 7, the width W1 of a first side of the neck portion 613 of the first shaft screw 610 is smaller than the width W2 of a second side perpendicular to the first side of the neck portion 613. The width W1 of the first side of the neck portion 613 is smaller than the width of the guide recess 530 of the first catching member 500, and the width W2 of the second side is smaller than the width of the guide recess 530 of the first catching member 500. Therefore, when the first shaft screw 610 is engaged with the first catching member 500, the first side of the first shaft screw 610 is located so as to be opposite to the guide recess 530 and is inserted into the through-hole 540. Then, if the first shaft screw 610 is rotated by an angle that is larger than 0 to 180 degrees, the first shaft screw 610 is prevented from being deviated from the though-hole 540 of the first catching member 500 through the guide recess 530.

The first shaft screw 610 has a body portion 615 which has a cross-section larger than the neck portion 613 and is extended from the neck portion 613 and an engaging portion 617 that is extended from the body portion 615.

The engaging portion 617 of the first shaft screw 610 is exposed to the rear surface of the back cover 400a when it is engaged with the liquid crystal display module. As shown in FIG. 6, the engaging member having a screw recess, i.e., the first nut screw 650 is engaged with the exposed engaging portion 617. A cross recess 651 is formed on the outside bottom surface of the first nut screw 650. The first shaft screw 610 and the first nut screw 650 are engaged by rotating the first nut screw 650 by using a cross driver. The first nut screw 650 can have an arbitrary shape, but if the first nut screw 650 has an angular shape, even in case the cross recess 651 is not formed, the first shaft screw 610 and the first nut screw 650 can be easily engaged by rotating the first nut screw 650 by using a separate tool.

As shown in FIG. 8, if the body portion 615 of the first shaft screw 610 is penetrated through the first engaging hole 331 of the top chassis 330, the fifth engaging hole 410 of the mold frame 400, and the ninth engaging hole 410a of the back cover 400a, the first nut screw 650 as shown in FIG. 6 is engaged with the engaging portion 617 to support the mold frame 400 and the back cover 400a.

The second to fourth shaft screws 620, 630, and 640 have the same structure as the first shaft screw 610. After the second to fourth shaft screw 620, 630, and 640 are engaged with the second to fourth catching members, they are penetrated through the second to fourth engaging holes 333, 335, and 337 of the top chassis 330, the sixth to eighth engaging holes 420, 430, and 440 of the mold frame 400, and the tenth to twelfth engaging holes 420a, 430a, and 440a of the back cover 400a and engaged with the second to fourth nut screws (not shown).

Figure 9:
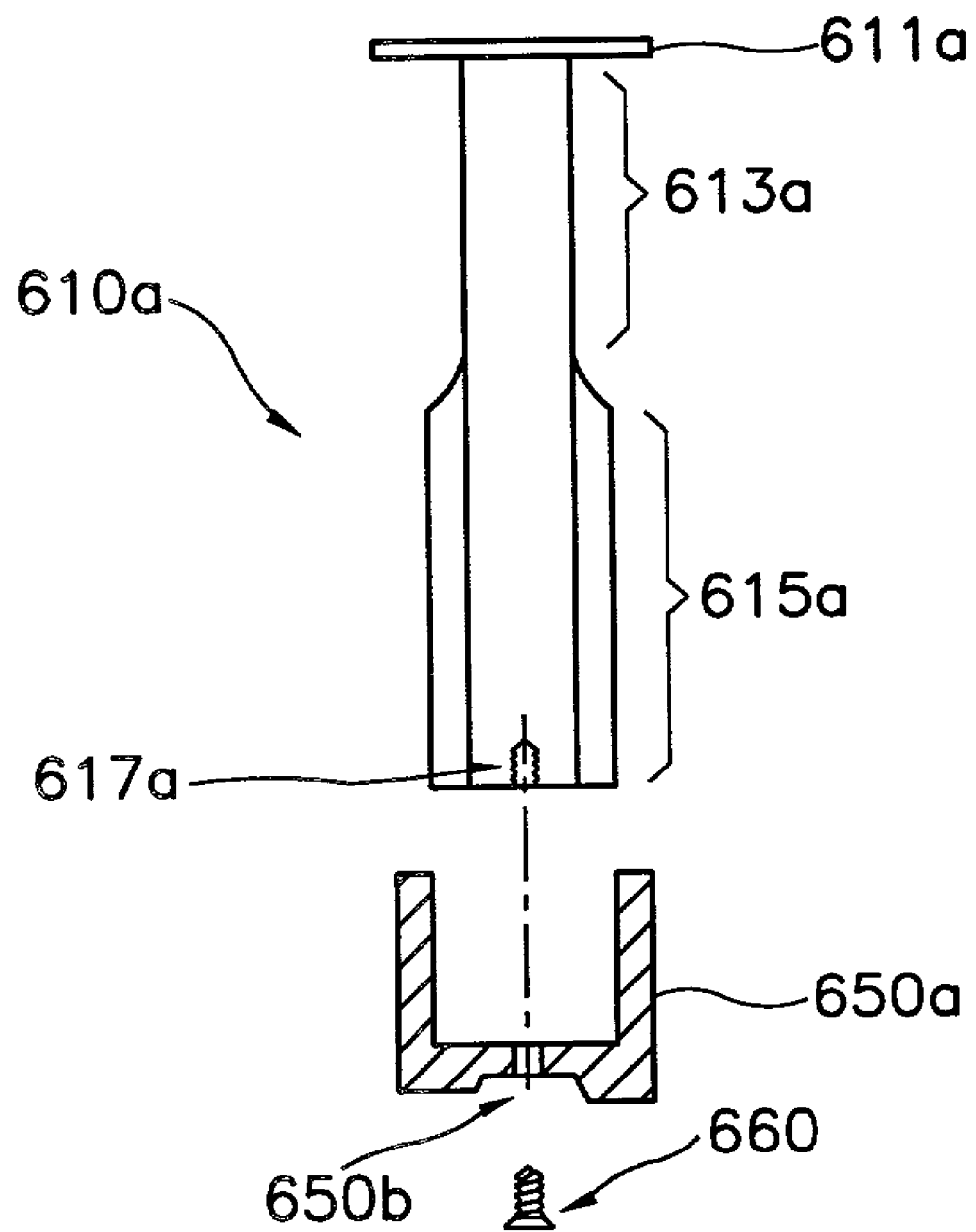
FIG. 9 is a cross-sectional view for showing another preferred embodiment of the shaft screw and the nut screw shown in FIG. 6.

On the other hand, the first shaft screw 610 and the first nut screw 650 can have a structure as shown in FIG. 9. Namely, the engaging portion 617 of the first shaft screw 610 shown in FIG. 6 is removed, the body portion 615 is extended longer like the body portion 615a of the shaft screw 610a shown in FIG. 9.

Next, a nut engaging portion 617a is formed by forming a screw recess from the bottom surface of the body portion 615a of the shaft screw 610a towards the interior of the body portion 615a. A cap 650a is engaged with the body portion 615a of the shaft screw 610a to support the mold frame 400. The cap 650a is formed by removing the screw recess in the first nut screw 650 shown in FIG. 6, and a cap penetrating hole 650b corresponding to the position of the nut engaging portion 617a is formed on the bottom surface.

The shaft screw 610a and the cap 650a is penetrated through the cap penetrating hole 650b, and is engaged by the engaging screw 660 proceeding to the nut engaging portion 617a. The shaft screw 615a and the cap 650a shown in FIG. 9 have the number of parts and the number of assembling processes more than the first shaft screw 610 and the first nut screw 650, but have the same function as the first shaft screw 610 and the first nut screw 650.

Hereinafter, a process in which the mold frame 400 and the back cover 400a are fixed to the front case 310 by using the first shaft screw 610 and the first nut screw 650 will be explained in detail with reference to FIG. 10.

Figure 10:
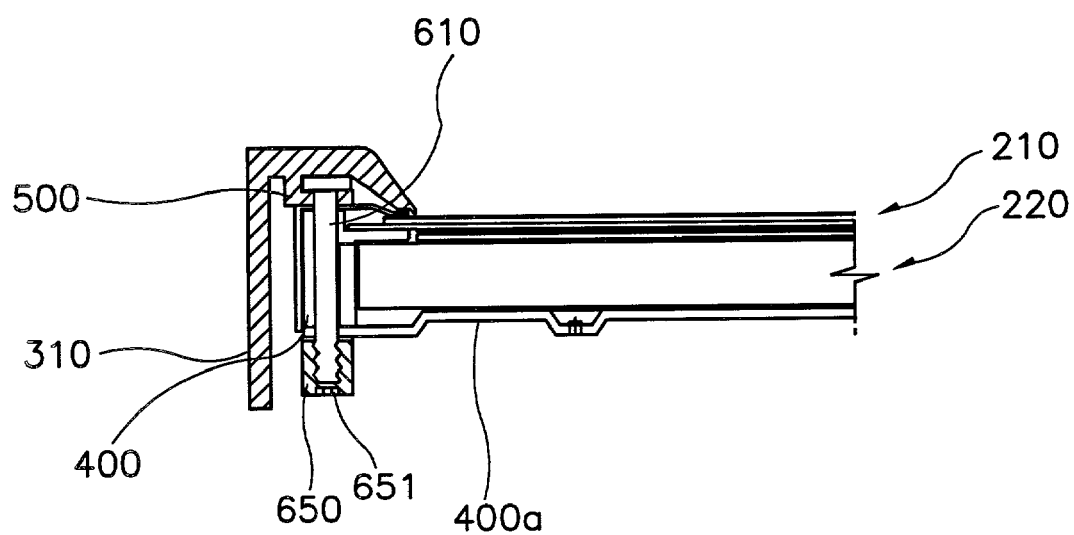
FIG. 10 is a cross-sectional view for showing the state in which the engaging member shown in FIG. 3 is engaged with the liquid crystal display device.

FIG. 10 is a cross-section for showing a state in which the engaging member according to the preferred embodiment of the present invention shown in FIG. 3 is engaged with the liquid crystal display device. Here, the engaging structure of the first shaft screw 610 will be explained, but the second to fourth shaft screws 620, 630, and 640 have the same engaging structure as the first shaft screw 610.

Referring to FIG. 10, the back light assembly 220 and the display unit 210 are sequentially received in a receiving space of the mold frame 400. The top chassis 330 for guiding the position of the display unit 210 and fixing the movement of the display unit 210 is engaged by a hook so as to surround the end portion of the upper surface of the display unit 210 and the mold frame 400. The top chassis 330 is engaged such that the first to fourth engaging holes 331, 333, 335, and 337 correspond to the fifth to eighth engaging holes 410, 420, 430, and 440 formed on the bottom surface of the mold frame 400. The back cover 400a is engaged with the rear surface of the mold frame 400 such that the ninth to twelfth engaging holes 410a, 420a, 430a, and 440a correspond to the fifth to eight engaging holes 410, 420, 430, and 440 of the mold frame 400.

Next, the neck portion 613 of the first shaft screw 610 slides into the guide recess 530 of the first catching member 500 formed on the inner side upper surface of the front case 310. If the neck portion 530 of the first shaft screw 610 is positioned in the through-hole 540 of the first catching member 500 and the head portion 611 of the first shaft screw 610 is positioned on the upper surface of the support surface 520 of the first catching member 500, the first shaft screw 610 is rotated to the right or to the left as shown in FIG. 8 lest it should be deviated from the through-hole 540.

The front case 310 engaged with the first shaft screw 610 is engaged with the upper surface of the top chassis 330 so that the body of the first shaft screw 610 is penetrated through the first engaging hole 331 of the top chassis 330, the fifth engaging hole 410 of the mold frame 400, and the ninth through-hole 410a of the back cover 400a. If the engaging portion 617 of the first shaft screw 610 is protruded to the rear surface of the back cover 400a by the engagement of the front case 310, the first nut screw 650 shown in FIG. 6 is engaged with the engaging portion 617 of the first shaft screw 610. The mold frame 400 in which the back light assembly 220 and the display unit 210 are received, and the back cover 400a are fixed to the front case 310 by the engagement of the first shaft screw 500 and the first nut screw 650. The engaging process is applied to the second to fourth catching members, the second to fourth shaft screws, and the second to fourth nut screws. Then, the rear case 320 is engaged with the front case 310, the engagement of the liquid crystal display device is completed.

On the other hand, the front case 310 can be engaged with the rear case 320 after the first shaft screw 610 is engaged with the first nut screw 650. The first shaft screw 610 is penetrated through the first engaging hole 331 of the top chassis 330, and the top chassis 330 is engaged with the mold frame 400 such that the first shaft screw 610 is penetrated through the fifth engaging hole 410 of the mold frame 400 in which the back light assembly 220 and the display unit 210 is received. Then, after the back cover 400a is adhered to the rear surface of the mold frame 400 such that the body of the first shaft screw 610 is penetrated through the ninth engaging hole 410a of the back cover 400a, the first nut screw 650 is engaged with the first shaft screw 610 to fix the top chassis 330, the mold frame 400, and the back cover 400a.

Then, the head portion 611 of the first shaft screw 610 is fixed to the first catching member 510 of the front case 310, the top chassis 330, the mold frame 400, and the back cover 400a are fixed to the front case 310. The engaging process is also applied to the second to fourth catching members, the second to fourth shaft screw, and the second to fourth nut screws. Then, if the rear case 320 is engaged with the front case 310, the engagement of the liquid crystal display device is completed.

According to the above-mentioned liquid crystal display module, the liquid crystal display device, and the assembling method, the engaging holes are overlapped with the lamp cover in the end portion of an unused area of the top chassis and the mold frame, and one side of the shaft screw is engaged with the catching member integrally formed with the inner side upper surface of the front case. The other side of the shaft screw is penetrated through the top chassis and the engaging hole of the mold frame and is engaged with the nut screw on the rear surface of the mold frame.

Namely, the shaft screw is engaged with the front case such that it is penetrated through the unused area of the top chassis and the mold frame, and the mold frame in which the back light assembly and the display unit is received is fixed to the front case by the engagement with the nut screw.

In a case where the back cover is provided on the rear surface of the mold frame, an engaging hole is formed at a position corresponding to the engaging hole formed in the mold frame is formed on the bottom surface of the back cover, and the engagement of the shaft screw and the nut screw is accomplished on the rear surface of the back cover.

Accordingly, a separate space for installing a fixing member for fixing the mold frame to the front case is not needed. Therefore, the overall size of the liquid crystal display device can be minimized. Further, since the front case is not engaged with the mold frame by using any separate screw, the number of parts and the number of the assembling processes are remarkably reduced.

As stated above, preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A display device, comprising:
    a mold frame comprising a main panel, sidewalls surrounding the main panel and a first engaging hole formed through the main panel;
    a backlight assembly disposed on an upper surface of the main panel and comprising a light source;
    a display panel disposed on the backlight assembly;
    a top chassis engaged with the mold frame to fix the display unit and the backlight assembly therebetween, the top chassis having a second engaging hole formed corresponding to the first engaging hole;
    a case having a catching member formed on a bottom surface of the case; and
    an engaging device having one end engaged with the catching member, the engaging device penetrating through the first and second engaging holes to assemble the mold frame and the top chassis.

2. The display device of claim 1, wherein the light source comprises:
    a lamp for generating light;
    a lamp holder engaged with both ends of the lamp to fix the lamp; and
    a lamp cover covering the lamp.

3. The display device of claim 2, wherein the first engaging hole is overlapped with the lamp cover when viewed from a side where the lamp is positioned.

4. The display device of claim 1, further comprising a back cover formed on a bottom surface of the mold frame.

5. The display device of claim 1, wherein the catching member is integrally formed with the bottom surface of the case.

6. The display device of claim 1, wherein the catching member comprises a support surface extending from and in parallel to a bottom surface of the case.

7. The display device of claim 6, wherein the catching member further comprises a through-hole formed at a center portion of the support surface and receiving an end of the engaging device.

8. The display device of claim 7, wherein the catching member further comprises a guide recess formed extending from the through hole to a side of the support surface for guiding the engaging device to the through-hole.

9. The display device of claim 8, wherein the engaging device comprises:
    a first engaging member comprising:
        a head portion wider than the through-hole and engaged with the catching member;

a body portion penetrating through the first and second engaging holes and protruding from a bottom surface of the mold frame; and an end portion having screw recess; and a second engaging member engaged with the screw recess of the first engaging member to fix the mold frame and the top chassis to the case.

10. The display device of claim 9, wherein a portion of the body portion adjacent to the head portion has a first thickness between a first side and a second side is smaller than a width of the guide recess.

11. The display device of claim 10, wherein the portion of the body portion adjacent to the head portion has a second thickness between a third side and a fourth side is greater than the width of the guide recess.

12. The display device according of claim 1, comprising a plurality of first engaging holes and a plurality of second engaging holes.

13. The display device of claim 1, wherein the case is a front case.

14. The display device of claim 4, wherein the back cover has a third engaging hole positioned corresponding to the first engaging hole.

15. The display device of claim 14, wherein the engaging device penetrates through the first engaging hole, the second engaging hole and the third engaging hole.

16. A display module, comprising:

a mold frame comprising a main panel, side walls surrounding the main panel and a first hole formed through the main panel;

a backlight assembly disposed on the mold frame;

a display panel disposed on the backlight assembly;

a top chassis disposed on the display panel and having a second hole formed corresponding to the first hole;

a case having a catching member formed on a bottom surface of the case; and an engaging device penetrating through the first hole and the second hole to fix the backlight assembly and the display panel between the mold frame and the top chassis.

* * * * *